United States Patent [19]

Bateson

[11] Patent Number: 4,500,230

[45] Date of Patent: Feb. 19, 1985

[54] PNEUMATIC GATE FOR RAILWAY HOPPER CARS

[75] Inventor: Norman E. Bateson, Culver, Ind.

[73] Assignee: Norson Industries, Inc., Culver, Ind.

[21] Appl. No.: 517,919

[22] Filed: Jul. 28, 1983

Related U.S. Application Data

[63] Continuation of Ser. No. 393,826, Jun. 30, 1982, abandoned, which is a continuation of Ser. No. 80,277, Oct. 1, 1979, abandoned.

[51] Int. Cl.³ ............................................. B65G 53/46
[52] U.S. Cl. .................................. 406/131; 222/556; 105/280; 406/145
[58] Field of Search ............... 406/128, 129, 131, 145; 222/556; 105/247, 250, 280, 283

[56] References Cited

U.S. PATENT DOCUMENTS

| 2,126,949 | 8/1938 | Ditchfield | 105/283 X |
| 2,345,468 | 3/1944 | Doyle | 105/283 X |
| 2,774,515 | 12/1956 | Johansson et al. | 222/556 X |
| 3,194,420 | 7/1965 | Kemp et al. | 406/128 |
| 3,215,473 | 11/1965 | Kemp et al. | 105/129 |
| 3,306,675 | 2/1967 | Fritz | 105/283 X |
| 3,350,141 | 10/1967 | McGrath | 406/145 X |
| 3,439,956 | 4/1969 | Ingram et al. | 406/131 |
| 3,482,741 | 12/1969 | Fritz | 105/283 X |
| 3,572,844 | 3/1971 | Mundinger et al. | 406/129 |
| 3,701,460 | 10/1972 | Dugge et al. | 406/145 X |
| 3,778,114 | 12/1973 | Carney, Jr. et al. | 406/129 |
| 4,114,785 | 9/1978 | Dugge | 222/556 X |
| 4,345,859 | 8/1982 | Robertson | 406/128 |

Primary Examiner—Jeffrey V. Nase
Attorney, Agent, or Firm—John R. Nesbitt

[57] ABSTRACT

A pneumatic gate for railway hopper cars which includes a non-tubular valve member deployed above a gate discharge tunnel, with said valve member being actuated by rotation about a bearing shaft which is disposed along an axis parallel with the axis of the gate discharge tunnel.

11 Claims, 22 Drawing Figures

PNEUMATIC GATE FOR RAILWAY HOPPER CARS

RELATED INVENTION

This application is a continuation of my co-pending U.S. patent application Ser. No. 06/393,826 filed June 30, 1982 and now abandoned which is a continuation of my U.S. patent application Ser. No. 06/080,277 filed Oct. 1, 1979 and now abandoned.

FIELD OF THE INVENTION

The field of this invention relates to railway hopper car discharge gates, and particularly to such devices that are pneumatically evacuated.

DESCRIPTION OF THE PRIOR ART

The prior art that is mainly in commercial use is exemplified by Fritz, U.S. Pat. No. 3,797,891, utilized in the North American Car Company or Fabco gate; by Adler, U.S. Pat. No. 3,980,212, utilized in the ACF Transportation Corporation gate and by Shaver, et al., U.S. Pat. No. 3,693,939, Shaver, et al., U.S. Pat. No. 3,700,143 and Adler, U.S. Pat. No. 3,724,909, all assigned to Pullman, Inc. and Pullman Transport Leasing Company.

The Pullman gate structure basically employs a housing divided into separate discharge chambers each including an elongated opening. The openings are regulated by valves slidably positioned. A trough is disposed beneath the openings for receiving materials therefrom and is adapted to be connected to a pneumatic conveying means. Each valve is movable to one side of the trough to an open position. A tunnel is provided at the top of the trough and is co-extensive therewith above the valve in its open position.

The principal problem with this type of valve construction described is its high cost of construction. The high cost derives mainly from the necessity to actuate the wedge shaped valve member in a direction transverse of the axis of the gate discharge tunnel. This requires expensive mechanical gearing arrangements and also requires a lot more material for the assorted shaft and gear members, all of which add unnecessary weight and cost to the gate structure. Another serious problem with this gate is its severely constricted discharge opening. New plastic particulate materials cause this gate to jam and clog at its discharge port.

Another approach to gate construction has been to position a rotatable ribbed shaft in the discharge opening between the bottom of the converging hopper walls and the gate discharge tunnel. This shaft is rotatable between a fully closed position wherein its ribs intersect and seal against the edges of the said discharge opening and a fully open position wherein said ribs are out of contact with said discharge opening and the open pocket between said ribs and fully exposed to the material disposed in the railway car above said shaft. This valve has proved difficult to maintain in good operating condition because materials tend to jam in the pockets between the ribs, thereby interfering with an operator's ability to rotate the valve to perform the necessary discharge operation. In fact, the valve is only about two inches in diameter and does not provide a large enough opening to permit discharge of the new standard type of plastic particulates. This valve also has no center bearing support and hence deflects, allowing pellets (particulates) to leak into the tube below. This valve also must move *against* the load to move and, in practice, it is common for an operator to torque the actuator handle right off the shaft.

The new ACF gate, called their "split butterfly valved discharge gate" also operates to open against the load and this requires considerable force, so much so, in fact, that a screw must be provided to provide sufficient mechanical advantage to actuate the valve levers.

SUMMARY OF THE INVENTION

One object of this invention is to provide an easily operable discharge valve structure for a discharge gate of a railway hopper car.

Another object is to provide such a valve structure that is relatively inexpensive in construction and yet which retains maximum reliability.

Another object of this invention is to maximize the effective width of the discharge opening for easy flow of the material being loaded.

Another object of this invention is to provide a cap for the gate discharge tunnel that is easily removable yet secure when closed.

DESCRIPTION OF THE INVENTION

The present invention eliminates the difficult clogging problem of the prior art devices wherein tubular valve structures are deployed above the opening at the bottom of the discharge hopper used with railway cars. This is accomplished by the use of an arcuate (although not necessarily arcuate) member 9 which is crescent shaped in cross-section and which is fixed to a rotatable shaft 10 having an axis disposed closely adjacent and substantially parallel with the discharge opening 4 between the bottom of the hopper 2 and the top of the gate discharge tunnel 5. In one preferred embodiment, each gate includes two valve shafts 10 with two valves 9, one valve 9 carried by each shaft. In another embodiment, the two valves are so designed and radially positioned on a shaft so that either side can be opened from one side of the car and each valve (two per shaft) can be sequentially (as well as simultaneously) opened or closed. This latter construction is shown schematically in FIG. 11, and is described in detail hereinafter. The reason for "either side control" is that to unload a car an air cleaner is placed on the tunnel outlet at the far side of the car (away from the operator), and the suction is on the other side and it is desired to operate the valves on the side the suction machine is on, so the vacuum gauge, etc. can be read. Operators also want to open the far side valve first with the near side closed. This is done on the Pullman gate with two shafts and two valves, the same way on the ACF gate, and on the North American gate by the location of the cut-outs in the valve. This is an important design feature for any gate of the present type because, if the near side is opened first and unloaded, air would then suck through the near side valve instead of the air filter on the far side outlet, and one could not unload the far side without changing the vacuum machine to the far side.

Figures 11A, 11D:
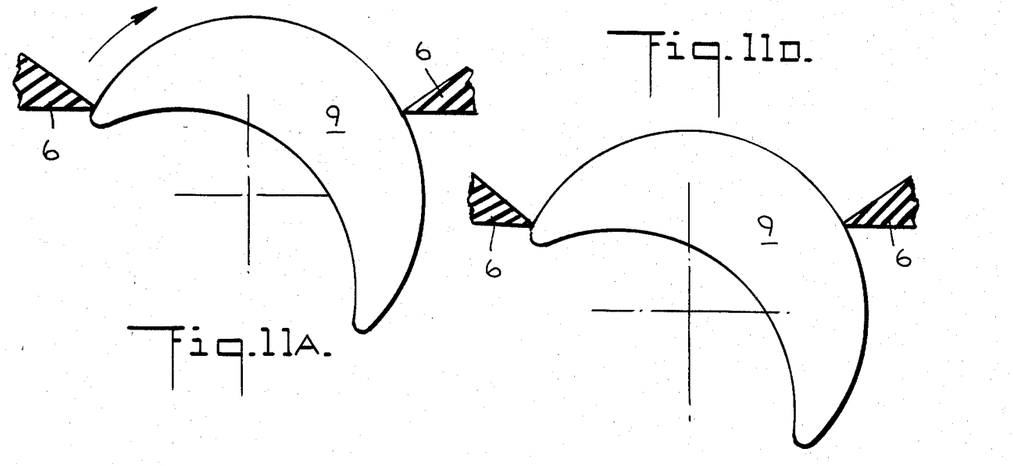
FIG. 11A through 11F are schematic representations of valve positions at various stages of shaft rotation.
Figures 11B, 11C, 11E, 11F:
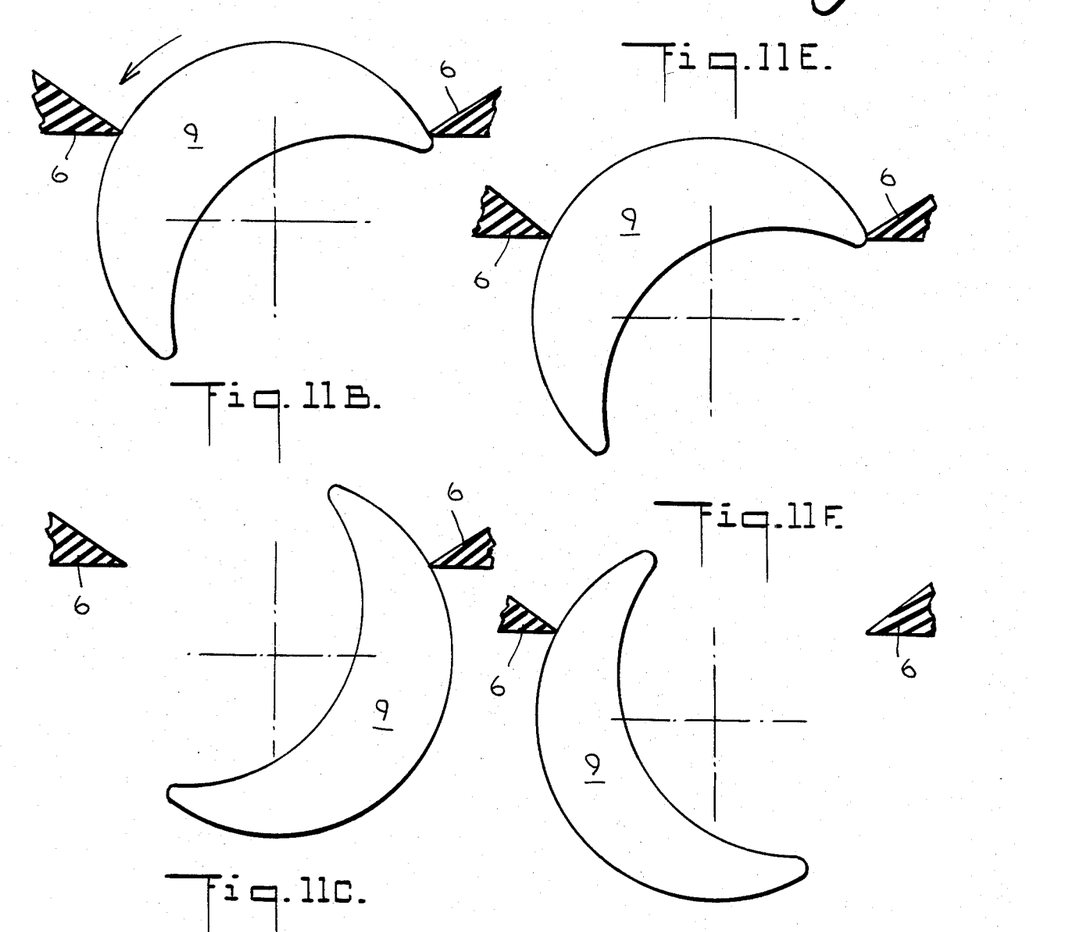
Figure 12:
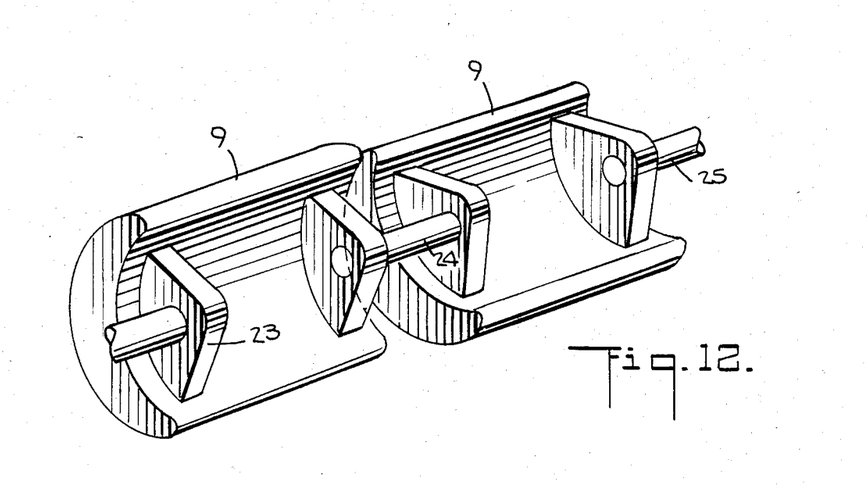
FIG. 12 is a perspective view showing the offset relationship of valve pairs mounted on a common shaft.

In the present invention the arcuate member 9 is crescent shaped in cross-section and is sized such that it may be rotated between a closed position (shown in FIG. 2) wherein one longitudinal edge 36 engages a boundary edge 6 of the said discharge opening between the hopper 2 and tunnel 5 and a fully open position (not shown) wherein the other longitudinal edge 37 of said arcuate member does not engage the other boundary edge 6 of said discharge opening. The effect of the offset mounting of valve pairs 9 is shown in FIGS. 11A through 11F, wherein FIG. 11A and 11B show the relative position of the valve pairs (near side closed-far side closed) during a certain rotational position of shaft 10. FIG. 11C and 11D show another operative position (near side closed-far side open), and FIGS. 11E and 11F show still another operative position (near side open-far side closed). It is apparent that if the valve pairs 9 are rotated 90° from the position shown in FIGS. 11C and 11D, or in 11E and 11F, the discharge opening will be open along its entire length.

The use of this type valve member eliminates the "pockets" that are subject to overloading and jamming associated with other prior art devices wherein slotted substantially tubular members or ribbed circular members are disposed above the said hopper discharge opening. By solving this problem, it then becomes an unnecessary and expensive expedient to employ a transversely slidable valve arrangement as employed in the patented Shaver gates previously described.

DETAILED DESCRIPTION OF THE INVENTION

Figure 1:
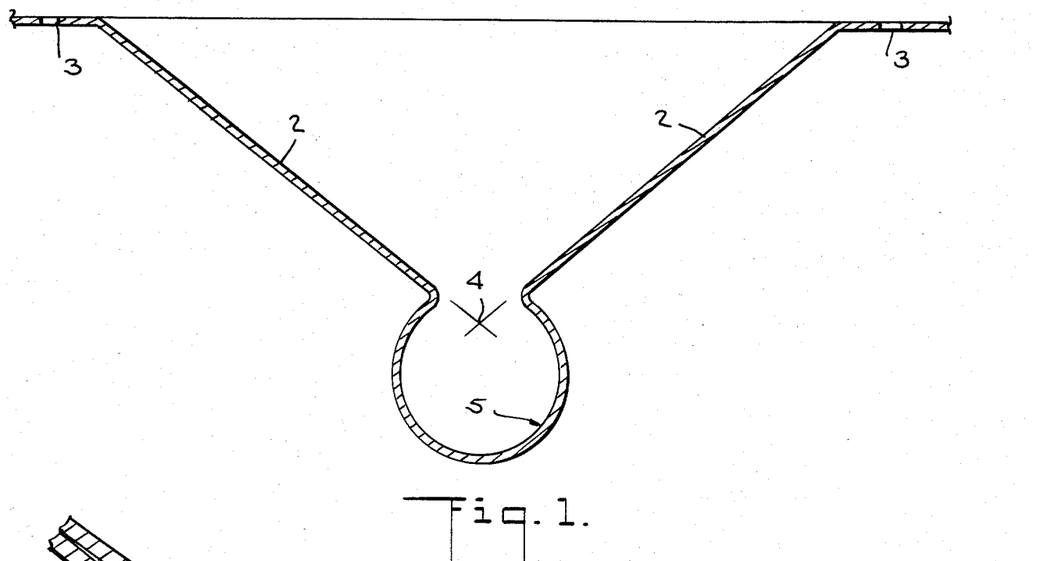
FIG. 1 is a cross-sectional view of a one-piece car hopper discharge structure.

A one-piece railway car hopper discharge structure is shown in FIG. 1 and includes converging walls 2 at the upper end and flanges 3 for attachment to the car. The converging walls 2 form a discharge aperture 4 at the lower end before widening out into a discharge tunnel 5 of tubular configuration. Cleanliness requirements for this gate demand that all welds be ground smooth inside with no porosity, hairline cracks or pin holes. The one-piece design of the discharge structure shown in FIG. 1 and FIG. 2 eliminates all longitudinal welds.

Figure 2:
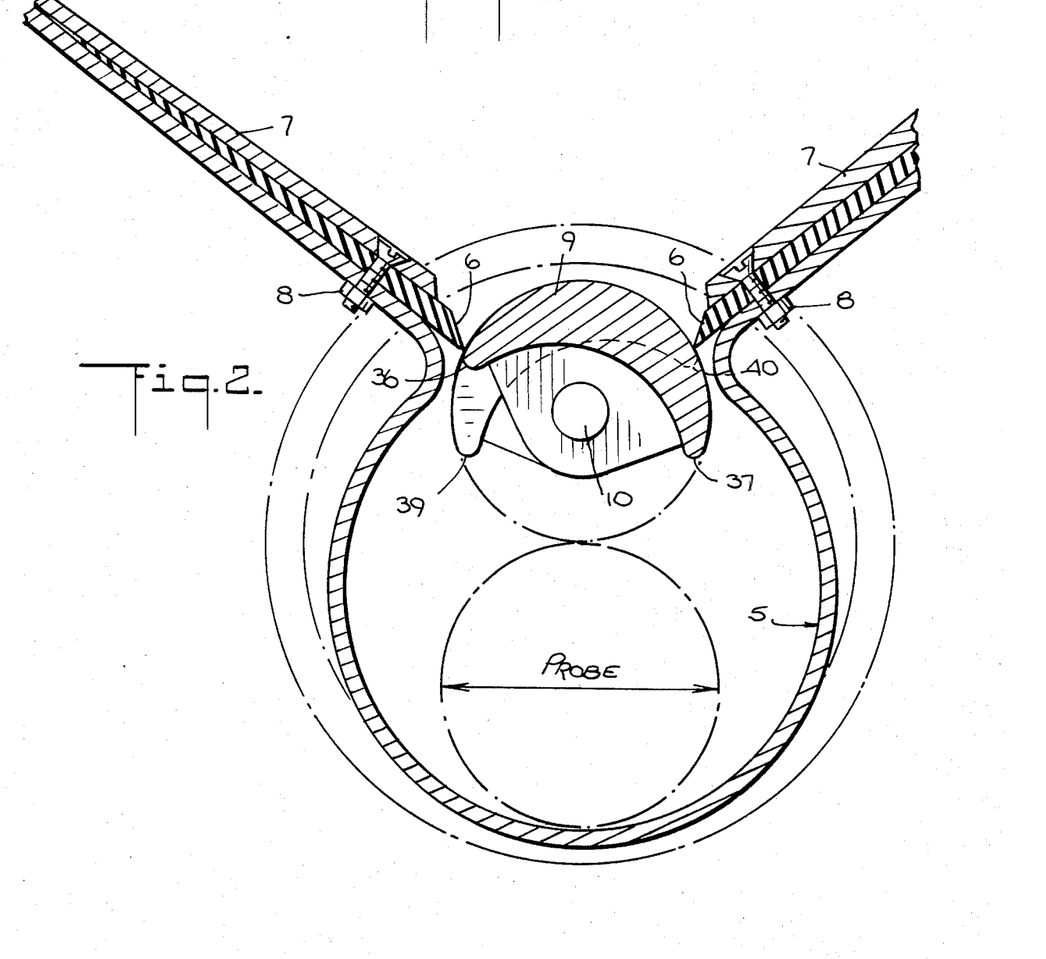
FIG. 2 is an enlarged cross-sectional view of the lower portion of the discharge structure shown in FIG. 1 with the "valve" of the present invention shown at the discharge portion of the hopper.

FIG. 2 shows the aperture 4 with rubber valve seals 6 retained by plates 7 with screws and nuts 8. The seals fit against valve 9 which rotates with the shaft 10. The valve 9 is located in tubular discharge tunnel 5 so that a three inch diameter probe can be inserted between the valve 9 in its inverted position (indicated in phantom lines) and the bottom of the discharge tunnel 5.

Figure 3:
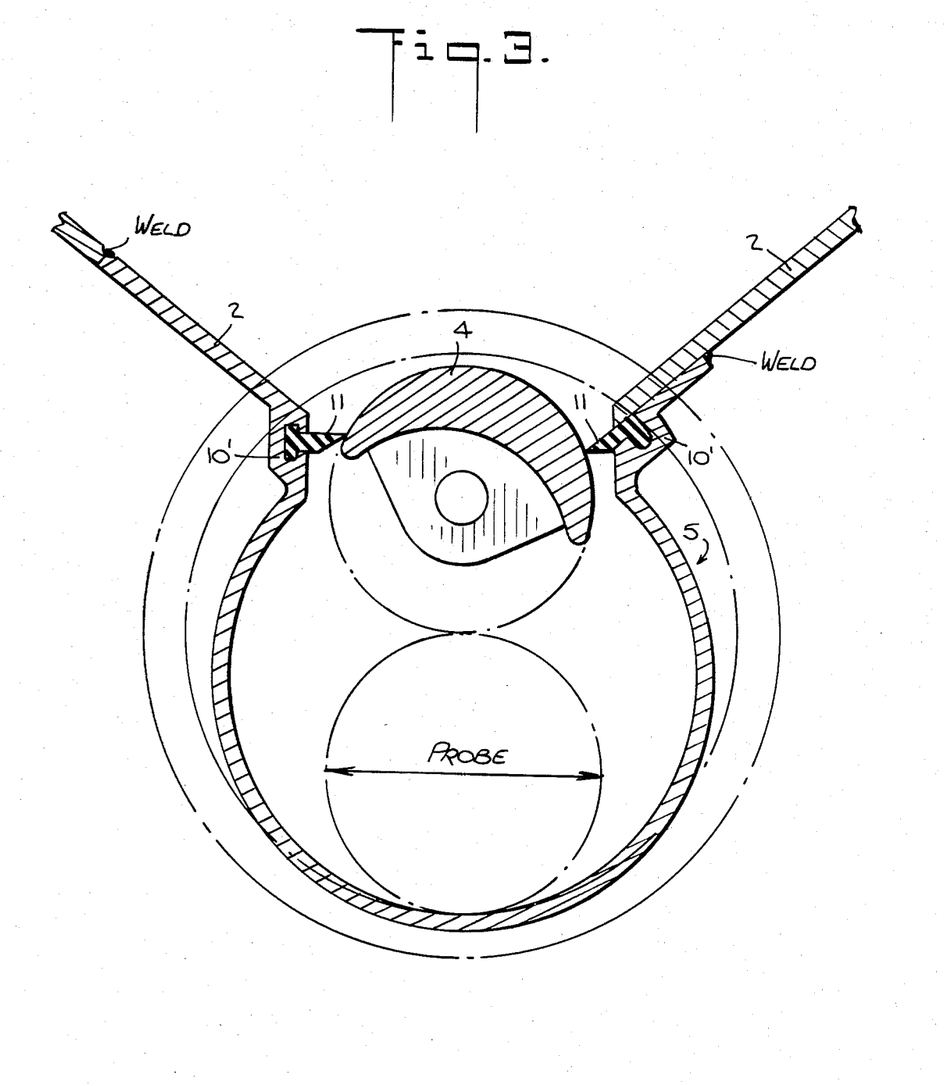
FIG. 3 is an enlarged cross-sectional view of another embodiment of the hopper structure shown in FIG. 1 with the valve in closed position.

FIG. 3 shows another type discharge structure wherein the aperture 4 and the discharge tunnel 5 are defined by extruding aluminum to make tunnel 5 and welding same to the converging walls 2 of the hopper with recessed shapes 10' in tunnel 5 that permit the rubber valve seals 11 to be slid into, and retained, in position without clamping. These seals may be made of any flexible material with good wear characteristics, and in fact may even be non-flexible such as cast nylon. However, some flexion in these seals tends to enhance gate opening and closing. The left side of FIG. 3 shows the extrusion 5 butting a converging wall 2. The weld at this point requires grinding inside with extreme care. The right side shows the extrusion 5 lapping under the wall 2, thus eliminating the care required in grinding the weld.

Figure 4:
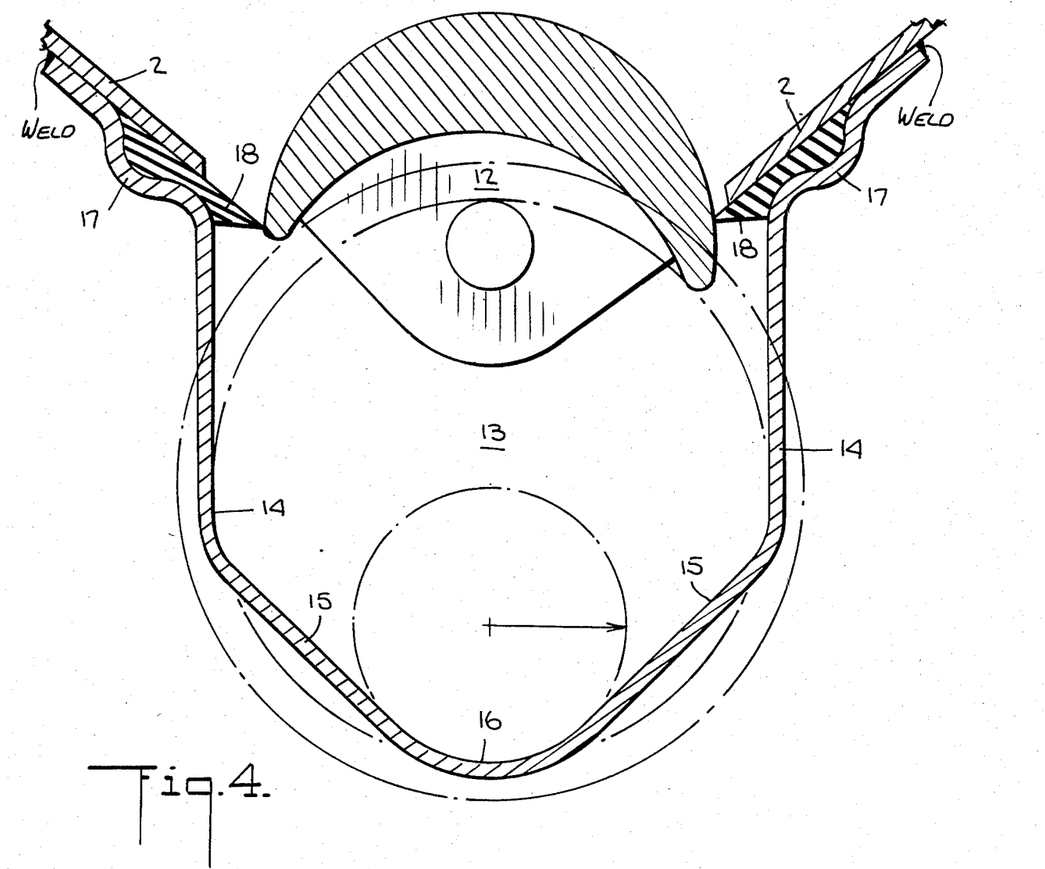
FIG. 4 is an enlarged cross-sectional view of another embodiment of the hopper structure shown in FIG. 1.

As the material unloaded with this gate is apt to bridge, it is desirable to have as large an aperture 12 (as shown in FIG. 4) as possible. In order to eliminate expensive extrusions, another embodiment is shown in FIG. 4. In this embodiment, the aperture 12 and outlet tunnel 13 are defined by formed aluminum with vertical walls 14 and bottom sloping walls 15 converging with a one-and-one-half inch radius 16 so that a three inch probe can be inserted. A portion of the top 17 of outlet tunnel 13 is formed so that rubber valve seal 18 can be slid in position and retained so that it cannot be pulled out in operation. Portion 17 is attached to the converging wall 2 on the outside of the gate by welding. This location of the weld eliminates the problems normally encountered which are associated with grinding, porosity, hairline cracks, pin holes, etc.

Figure 5:
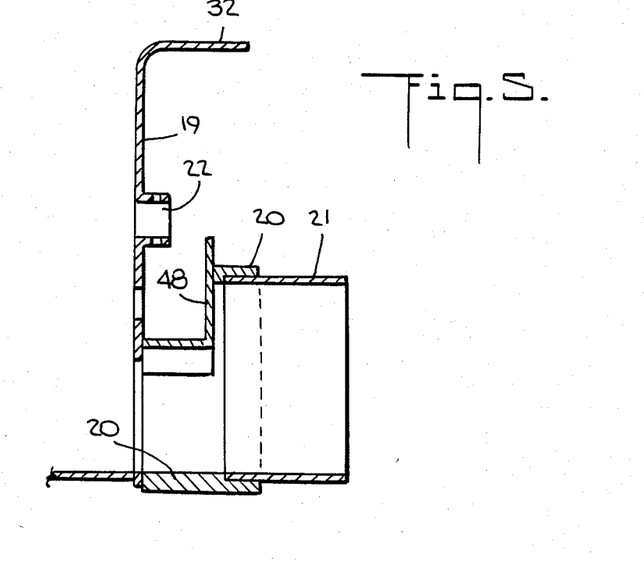
FIG. 5 is an end-sectional view of the end cap on a discharge hopper tube of the type shown in FIG. 1.
Figure 6:
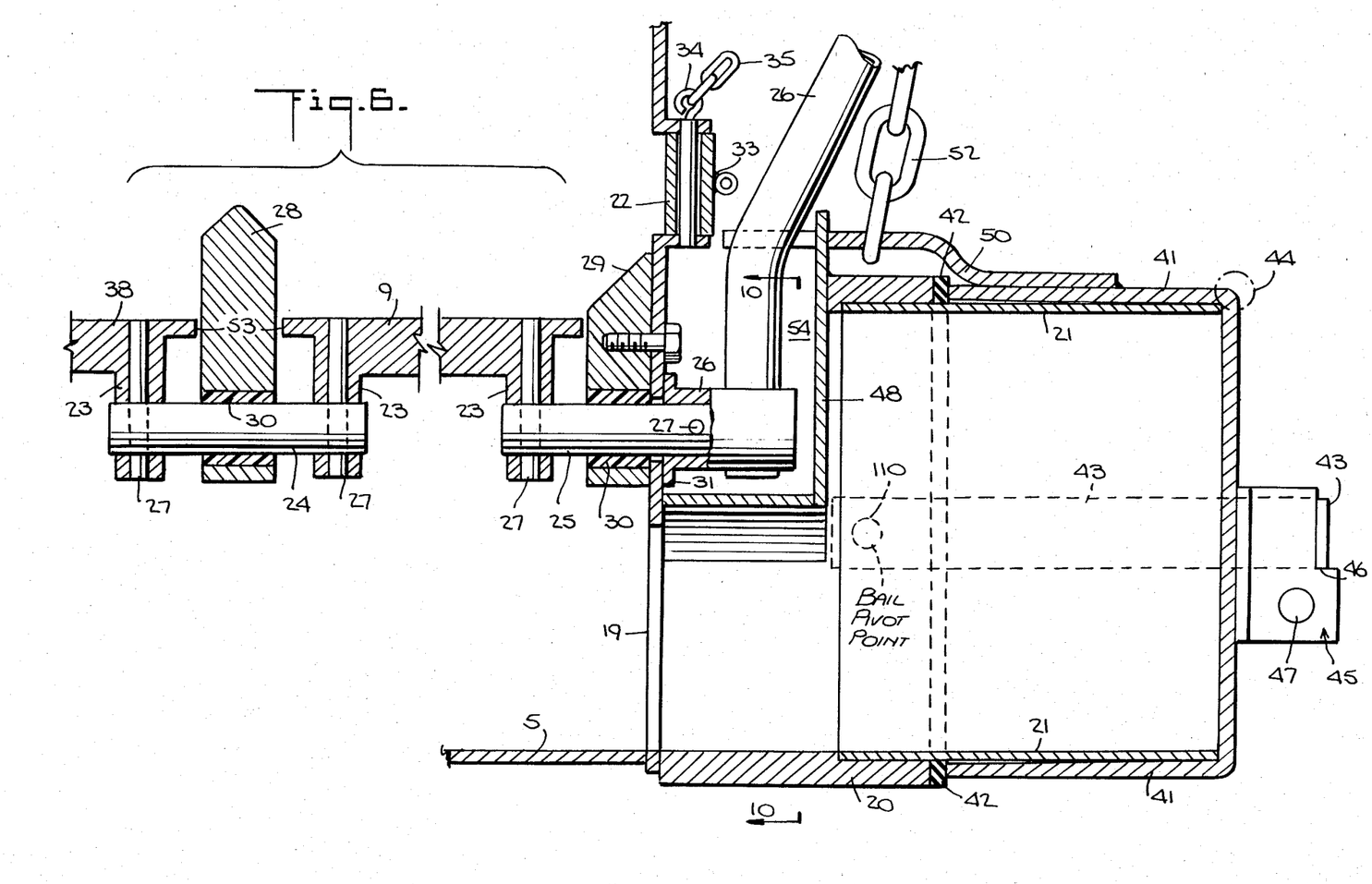
FIG. 6 shows a valve in longitudinal cross-section.

FIG. 5 shows the hopper discharge structure of FIG. 6 as it is closed at its ends by vertical end panel or cap 19 with aluminum outlet 20 attached thereto. Stainless steel tube 21 is of such dimensions that standard vacuum unloaders can be connected to it and it is pressed into outlet 20. A clean-out aperture 22 is above the outlet and the valve so that if the load bridges, a probe rod can be inserted to break up the load.

FIG. 6 shows valve 9 in longitudinal section with $\frac{3}{8}$ inch thick supports 23 with center shaft 24 and end shaft 25. The valve is operated with handle 26. The support 23 and handle 26 are attached with 5/16 inch diameter drive pins 27 and drilled in such a manner that the pins can be driven through for disassembly. As shown in FIG. 6, one of the valves 9 is also secured to the shaft 25 and to the shaft 24 by pins 27, and the other valve 9 is secured to the shaft 24 by a pin 27 so that the two valves 9 rotate together. Without one of the pins 27 which connect the valves 9 to the shaft 24 one of the valves 9 would be rotatable independently of the other valve 9. The valve supports 23 are spaced one-half inch from the center bearing support 28 and end bearing support 29 so that material cannot be lodged between them and it can be readily cleaned. The configuration of bearing supports 28 and 29 is such that, when the valve 9 is in the full open or inverted position, the edges 53 can be seen and cleaned through the outlet supports. End bearing supports 28 and 29 have a 45° sloping top surface so the material can flow off and no ledge is formed.

The bearings 30 are a woven plastic with seals on both ends for cleanliness.

Thrust washer 31 is made of steel and the handles 26 are located longitudinally such that the end faces of the aluminum valve 9 do not rub on the bearing supports 28 and 29, which supports are also aluminum so that galling is prevented. The handle 26 is bent outward to accommodate a tube being placed over it for more leverage and to clear the top flange 32 of the end panel shown in FIG. 5. The clean-out hole 22 is closed by a plug 33 with a handle and held in place with cotter pin 34 which is chained by chain 35 to the gate and plug so it cannot be lost.

The valve 9 of FIG. 2 is of such a configuration that when it turns on its axis, none of the load is displaced. In other words, the valve surface can slide circumferentially radially under the load without lifting or displacing any part of the load, which is not the case with any of the other known prior art devices. This is important for ease of operation and minimum force on the operating handle. The centerline of the axis of the valve is near (or slightly below) the center of the aperture 4 so that when the car is loaded, the weight of the lading does not tend to either open or close the valve.

As shown in FIG. 2, the far side valve is in closed position when it is rotated clockwise, the left edge 36 moves above the left hand rubber seal 6, thus opening the valve. When rotated counterclockwise, the right hand edge 37 moves $1\frac{7}{8}$ inches before the valve starts to open. The near side valve, due to the location of its left hand edge 39, when rotated clockwise, remains sealed until the far side valve is open over $1\frac{7}{8}$ inches, and due to its right hand edge location 40, if the valve is rotated counterclockwise, the near side opens immediately and the far side remains closed until the near side opens over $1\frac{7}{8}$ inches. These relationships are evident in FIGS. 11A through 11F. This is true no matter which end of the valve is being operated, and if the valve shaft is moved far enough in either direction, both valves will be open and the valves will be inverted where the gate and valves can readily be washed and cleaned. The reason for this is that, if the near side is open first and unloaded, air would be sucked through the near side valve instead of the air filter on the far side outlet and the operator could not unload the far side without changing the vacuum machine to the far side.

Operation in the Field

A large company like Western Electric has large unloading vacuum machines so they like both valves to be open with the far one open more than the near one where the vacuum machine is connected. A small user does not have the capacity to unload fast, so they require only one side at a time starting with the far side.

Figure 7A:
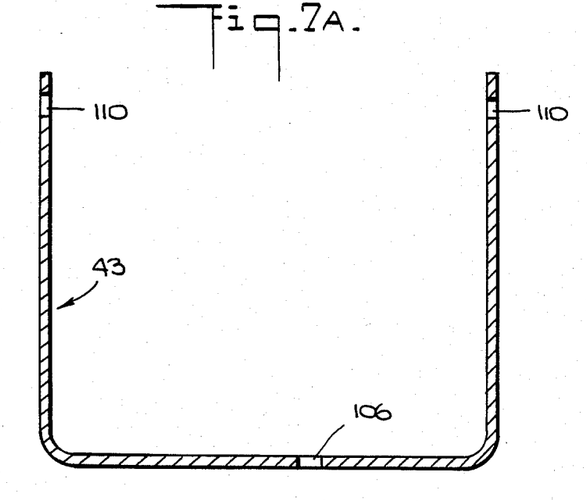
FIGS. 7a–7c are respectively cross-sectional plan, side and end views of the spring bail shown in assembled position in FIG. 6.
Figure 7B:
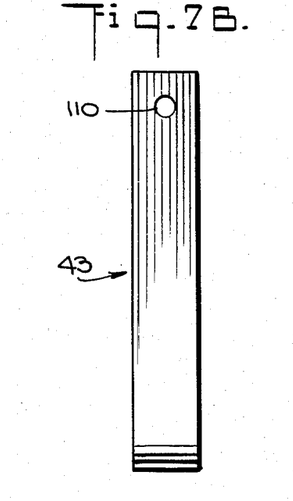
Figure 7C:
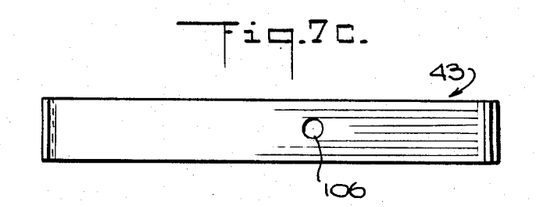
Figure 8A:
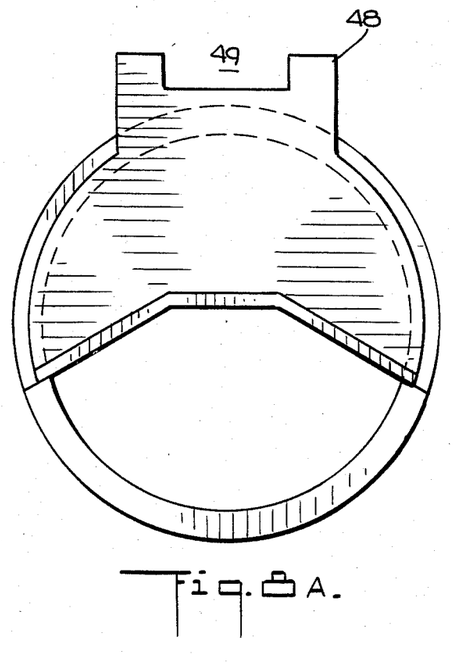
FIGS. 8a and 8b are respectively end and side elevation views of the bracket shown in assembled position in FIG. 6.
Figure 8B:
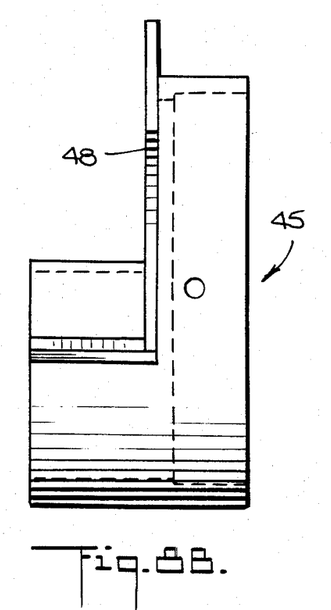
Figure 9A:
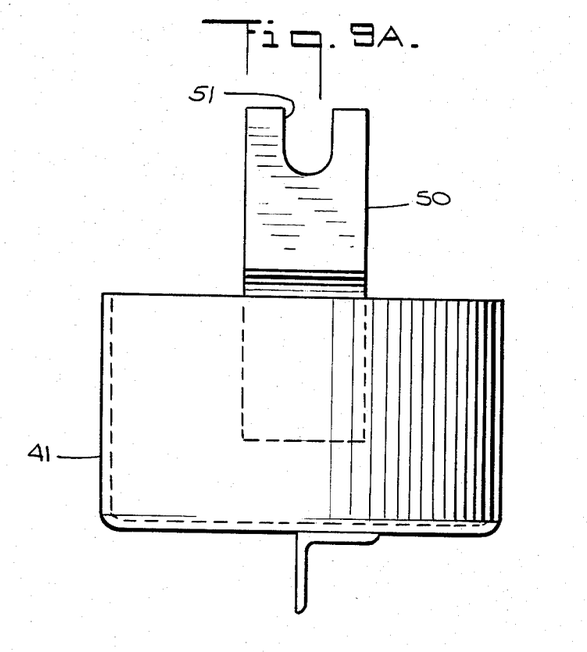
FIGS. 9a–9c are respectively bottom, end and side views of the cap and upper bracket shown in assembled position in FIG. 6.
Figure 9B:
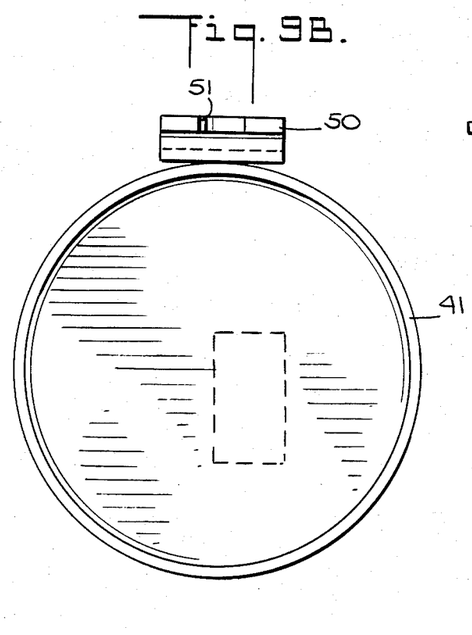
Figure 9C:
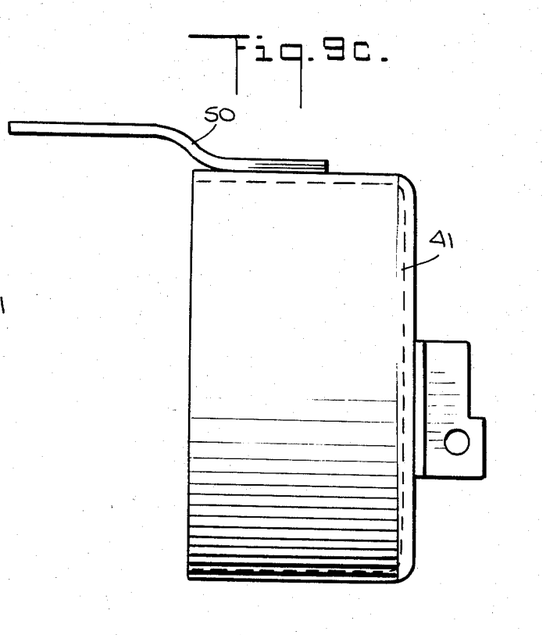

As shown in FIG. 6, the outlet tube 21 is closed for transit by cap 41 pressed against gasket 42. The cap is held in place by spring bail 43 and the bail pivot point 110 is so located that it is a spring fit over the top corner 44 of cap 41. Bracket 45 is made so that the bail 43 is also a spring fit onto it and lip 46 stops the bail from falling down in transit. The two spring fits at the bracket and cap eliminate the possibility of the cap coming off in transit. Hole 47 in the bracket 45 and a similar hole 106 in the bail 43, as shown in FIG. 7a, is for a wire seal. Aluminum outlet 20 (as shown in FIG. 6) is equipped with a face plate 48, as shown in FIGS. 8a and 8b, with a two inch slot 49 which fits bracket 50 which is attached to cap 41, all as shown in FIGS. 6 and 9a-9c. Bracket 50 also has a slot 51 which fits around the handle 26. The cap as shown in FIG. 6 has the advantage that a single operation with the bail locks both the cap in position and the valve in the closed position.

Cap 41 cannot be put on the outlet unless its upper bracket 50 fits in slot 49 and around operating handle 26 in its vertical position. This ensures that the valve is closed and locked in position when the cap 41 and bail 43 are in place and sealed. Hence the bail forms a double lock by having to spring over the top of bracket 45 and also over the top point 44 of the cap (as shown in FIG. 6).

Chain 52 (shown in FIG. 6) is fastened to cap bracket 50 and also to a bracket at the bolting flange of the gate to the car (not shown). It is in this location so the caps are not lost and when the cap is off, it does not have a seven inch diameter of cap plus another seven inches of chain (if attached to the bottom of the cap) dangling on the ground as is common in competing devices.

The outlet assembly 20 is made with a recess 54 in the upper part so that the operating handle can be located between the outlet tube 21 and the end panel 19.

Figure 10:
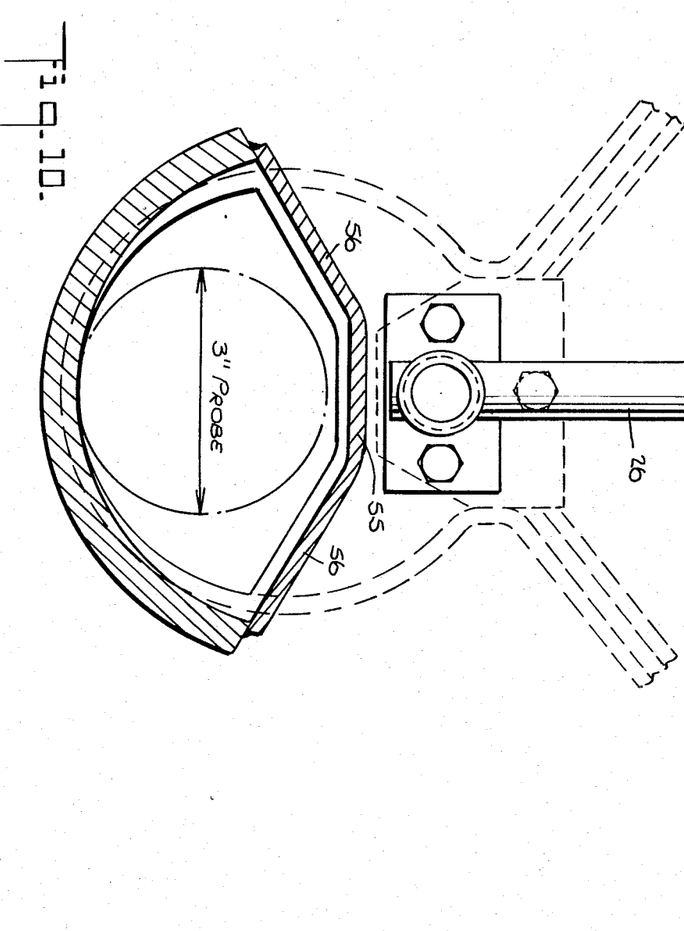
FIG. 10 is an end-view, partly in cross-section of the assembly shown in FIG. 6, with the cap and a portion of the bracket removed.

The longitudinal faces 56 shown in FIG. 10 slope downward from face 55. This is to allow the maximum rotation of the valve and still allow the insertion of a three inch probe.

It will be appreciated by those skilled in the art that other obvious modifications of the new gate proposed are possible, but this invention is limited only by the scope of the appended claims.

What is claimed is:

1. A hopper discharge structure having a discharging valve for evacuating granular-like lading from hopper cars and the like:
   (a) a hopper structure providing end walls and inclined side walls, the confronting lower edges of which are spaced apart to provide a discharge opening therebetween;
   (b) a valve shaft comprising two axially aligned portions secured to each other for rotation together around their axes and rotatably supported between said end walls along a line parallel to said discharge opening formed between said inclined side walls, the axial length of said portions being at least equal to the length of said discharge opening and each of said portions, for substantially the axial length thereof and in cross-sections perpendicular to the axis of said shaft, having a peripherally extending arcuate outer surface which is less than 360° but which has a peripheral extent between the peripheral edges of said outer surface sufficient to extend at least from one of said confronting lower edges to the other of said confronting lower edges and having an inner surface extending from one of said peripheral edges to the other, said inner surface being spaced from said outer surface substantially throughout its length between said peripheral edges by an amount greater than the spacing between said inner surface and said outer surface at said peripheral edges;
   (c) said valve shaft having its axis of rotation located equally between and along a line beneath said confronting lower edges of said inclined side walls with the outer surfaces of said portions having a radius such that such outer surfaces sit within and close said discharge opening;
   (d) said portions being mounted with their outer surfaces displaced in the peripheral direction with respect to each other to provide a plurality of channels formed in selective portions thereof, with one channel in one portion extending throughout the length of said valve shaft, and with partial channels formed in adjacent portions and of a length less than said one channel and on diametrically opposite sides thereof;

(e) means for rotating said shaft within said discharge opening so as to position said channels into selective lading discharging positions;

(f) a trough underlying said valve shaft and enclosing said discharge opening for receiving the lading flowing therethrough, and (g) a discharge port mounted on said trough externally of said side walls through which the lading is exhausted under pneumatic or vacuum means.

2. A hopper discharge structure as set forth in claim 1 wherein said axially aligned portions are axially spaced from each other and further comprising bearing means intermediate said last-mentioned portions engaging and supporting said shaft.

3. A hopper discharge structure as defined by claim 1 including a cap for said discharge port, with said cap having means preventing rotational movement of said means for rotating said valve shaft when said cap is mounted on and closes said discharge port.

4. A hopper discharge structure having a discharging valve for evacuating granular-like lading from hopper cars and the like comprising:

(a) a hopper structure providing end walls and inclined side walls, the confronting lower edges of which are spaced apart to provide a discharge opening therebetween;

(b) a cylindrical valve shaft rotatably supported between said end walls along a line parallel to said discharge opening formed between said inclined side walls;

(c) said valve shaft having its axis of rotation located equally between and along a line beneath said confronting lower edges of said inclined side walls;

(d) an arcuate member having a periphery of less than 360° fixed to said shaft for rotation therewith, said arcuate member having an arcuate outer surface extending circumferentially of said axis of rotation and of a size such that in at least one of its rotated positions no portion of its periphery intersects said lower edges of the hopper, so that said aperture is fully open, and in another of its rotated positions, two portions of its periphery intersect said lower edges so that said aperture is closed and said arcuate member also having an inner surface extending from one peripheral edge of said outer surface to the other peripheral edge of said outer surface, said inner surface being substantially coextensive with said outer surface for substantially the axial length of said outer surface and being spaced from said outer surface substantially throughout its length between said one peripheral edge and said other peripheral edge by an amount greater than the spacing between said inner surface and said outer surface at said peripheral edges;

(e) means for rotating said shaft within said discharge opening so as to selectively position said arcuate member into said positions thereof;

(f) a trough underlying said valve shaft and enclosing said discharge opening for receiving the lading flowing therethrough, and (g) a discharge port mounted on siad trough externally of said side walls through which the lading is exhausted under pneumatic or vacuum means.

5. A hopper discharge structure as set forth in claim 4 wherein the inner surface of said arcuate member is arcuate and has a radius greater than the radius of said outer surface whereby said arcuate member is substantially crescent shaped in a cross-section perpendicular to the axis of said shaft.

6. The hopper gate according to claim 4 in which the said lower edge portions of the hopper are flexible and engage said arcuate outer surface of said arcuate member, whereby rotation of said arcuate member is facilitated and valve jamming by the lading disposed above in the hopper is minimized.

7. A hopper discharge structure as defined by claim 4 including a cap for said discharge port, with said cap having means preventing rotational movement of said means for rotating said valve shaft when said cap is mounted on and closes said discharge port.

8. A hopper discharge structure having a discharging valve for evacuating granular-like lading from hopper cars and the like comprising:

(a) a hopper structure providing end walls and inclined side walls, the confronting lower edges of which are spaced apart to provide a discharge opening therebetween;

(b) a cylindrical valve rotatably supported between said end walls along a line parallel to said discharge opening formed between said inclined side walls;

(c) said valve shaft having its axis of rotation located equally between and along a line beneath said confronting lower edges of said inclined side walls, and (d) an arcuate member having a periphery of less than 360° fixed to said shaft for rotation therewith, said arcuate member having an arcuate outer surface extending circumferentially of said axis of rotation and of a size such that in at least one of its rotated positions no portion of its periphery intersects said lower edges of the hopper, so that said aperture is fully open, and in another of its rotated positions, two portions of its periphery intersect said lower edges so that said aperture is closed and said arcuate member having an inner surface which is nonparallel to said outer surface thereof and extending from one peripheral edge of said outer surface to the other peripheral edge of said outer surface, said inner surface being substantially co-extensive with said outer surface for substantially the axial length of said outer surface and being spaced from said outer surface substantially throughout its length between said one peripheral edge and said other peripheral edge by an amount greater than the spacing between said inner surface and said outer surface at said peripheral edges thereby to provide a rigid arcuate member capable of withstanding the load of the lading; and (e) means for rotating said shaft within said discharge opening so as to selectively position said arcuate member into positions thereof.

9. A hopper discharge structure as set forth in claim 8 wherein the inner surface of said arcuate member is arcuate and has a radius greater than the radius of said outer surface whereby said arcuate member is substantially crescent shaped in a cross-section perpendicular to the axis of said shaft.

10. A hopper discharge structure as set forth in claim 8 further comprising a further arcuate member of the same construction as said first-mentioned arcuate member mounted co-axially with the latter and in axial alignment with the latter, said further arcuate member having its outer surface peripherally displaced with respect to the outer surface of said first-mentioned arcuate member so that in one rotational position of said shaft said discharge opening is closed, in another rotational position of said shaft, a first portion of said discharge opening is closed and a second portion thereof is open and in another rotational position of said shaft said first portion of said discharge opening is open and said second portion thereof is closed.

11. A hopper discharge structure as set forth in claim 10 wherein said further arcuate member is axially spaced from said first-mentioned arcuate member and further comprising bearing means intermediate said further arcuate member and said first-mentioned arcuate member engaging and supporting said shaft.

* * * * *